(12) United States Patent
Itoga et al.

(10) Patent No.: US 7,584,991 B2
(45) Date of Patent: Sep. 8, 2009

(54) AIRBELT APPARATUS

(75) Inventors: Yasuo Itoga, Tokyo (JP); Yoshiki Murakami, Tokyo (JP); Kiyotaka Ohhashi, Tokyo (JP); Masahiro Higuchi, Tokyo (JP)

(73) Assignee: Takata Corporation, Tokyo (JP)

( * ) Notice: Subject to any disclaimer, the term of this patent is extended or adjusted under 35 U.S.C. 154(b) by 248 days.

(21) Appl. No.: 11/541,584

(22) Filed: Oct. 3, 2006

(65) Prior Publication Data

US 2007/0080528 A1 Apr. 12, 2007

(30) Foreign Application Priority Data

Oct. 7, 2005 (JP) .............................. 2005-295143
Aug. 3, 2006 (JP) .............................. 2006-212246

(51) Int. Cl.
*B60R 21/18* (2006.01)
(52) U.S. Cl. .................................... 280/733; 280/728.2
(58) Field of Classification Search ................. 280/733, 280/728.2
See application file for complete search history.

(56) References Cited

U.S. PATENT DOCUMENTS

| | | | |
|---|---|---|---|
| 3,970,329 | A | 7/1976 | Lewis |
| 5,346,250 | A * | 9/1994 | Kamiyama .................. 280/733 |
| 6,116,637 | A | 9/2000 | Takeuchi et al. |
| 6,237,946 | B1 | 5/2001 | Nariyasu |
| 2002/0074784 | A1 | 6/2002 | Mishima et al. |
| 2003/0230872 | A1 | 12/2003 | Sakai et al. |
| 2005/0184491 | A1 | 8/2005 | Itoga |
| 2005/0189749 | A1 | 9/2005 | Itaoga et al. |
| 2006/0055158 | A1 * | 3/2006 | Park .......................... 280/733 |
| 2006/0237954 | A1 * | 10/2006 | Kokeguchi .................. 280/733 |

FOREIGN PATENT DOCUMENTS

| | | |
|---|---|---|
| CA | 2102334 A1 * | 5/1995 |
| EP | 0 652 140 A1 | 5/1995 |
| EP | 0 901 945 A2 | 3/1999 |
| EP | 0 965 496 A1 | 12/1999 |
| EP | 0 970 855 A1 | 1/2000 |
| JP | 7-52736 | 2/1995 |
| JP | 2000-6755 | 1/2000 |
| JP | 2000-212864 | 8/2000 |
| JP | 2001-122065 | 5/2001 |
| JP | 2001-260807 | 9/2001 |
| JP | 2003-312439 | 11/2003 |
| JP | 2004-98753 | 4/2004 |
| JP | 2004-106651 | 4/2004 |

* cited by examiner

*Primary Examiner*—Paul N. Dickson
*Assistant Examiner*—Drew J. Brown
(74) *Attorney, Agent, or Firm*—Foley & Lardner LLP (57) ABSTRACT

The disclosed airbelt apparatus may provide an airbelt capable of being connected to an anchor. The airbelt apparatus may comprise an anchor and an airbelt with a bag and a mesh webbing covering the bag. The anchor may have an opening, wherein only a tip end side of a portion of the airbelt is inserted into the opening. The portion of the airbelt can be the mesh webbing only or a combination of the mesh webbing and a webbing. The portion of the airbelt inserted into the opening can be folded back so as to overlap onto a base end side of the airbelt, and the tip end side of the portion of the airbelt and the base end side of the airbelt are stitched together.

13 Claims, 10 Drawing Sheets

AIRBELT APPARATUS

BACKGROUND

The present invention relates to a member for protecting an occupant of a vehicle, such as a motor vehicle or the like at a time of a motor vehicle collision or the like, and more particularly to an airbelt configured to be expanded by gas from a gas generating device. Further, the present invention relates to an airbelt apparatus provided with the airbelt and an anchor.

As is widely known, the airbelt apparatus is an apparatus in which a part of a webbing of a seatbelt apparatus (specifically, the part to be in contact with a body of an occupant) is constructed with an expandable airbelt. A gas generating device is activated at the time of collision of a motor vehicle, and the airbelt is expanded. The Unexamined Japanese Patent Application Publication No. 2001-260807 (incorporated by reference herein) describes an airbelt apparatus in which one end of the airbelt is connected to a tongue, a gas passage is provided in the tongue and a buckle to which the tongue is mounted, and gas is introduced into the airbelt through the gas passage. The other end of the airbelt is connected to a webbing in a similar manner to that of an ordinary seatbelt apparatus by means of stitching work, and the webbing is retracted by a seatbelt retractor.

In a case that the airbelt is connected to the tongue, a tip end of the airbelt is outfitted on a cylindrical portion provided at a rear end of the tongue, and is tightened with a hose band from the outside.

Instead of connecting the airbelt to the tongue to which the gas can be introduced, the airbelt is sometimes connected to a lap anchor having an inflator, and the gas from the inflator is introduced into the airbelt.

The connecting strength of the connecting portion of the airbelt with the tongue or the lap anchor, and the connecting strength of the connecting portion of the airbelt with the webbing with the stitching work is preferred to be as high as possible.

Consequently, motivated to provide an airbelt apparatus having a high connecting strength at these connecting portions, an airbelt apparatus can be considered in which the connected body of the airbelt and the anchor can include an airbelt comprising a bag and mesh webbing that covers the bag such that gas can be introduced in the airbelt. A tongue can be connected to the tip end of the airbelt and an opening is provided at a rear end of the tongue. The tip end of the airbelt can be folded back and overlapped on the airbelt after the tip end of the airbelt is inserted into the opening. The portions of the airbelt overlapped with each other are stitched together.

In this kind of proposed airbelt apparatus, not only the mesh webbing but also the bag is inserted into the opening of the tongue, and therefore the opening is required to have a large size.

An object of the present invention is to provide an airbelt apparatus with an airbelt and an anchor capable of connecting the airbelt to the anchor even when the size of the opening of the tongue is reduced.

SUMMARY

In one embodiment of the present invention, an airbelt apparatus is disclosed in which the airbelt apparatus can include an airbelt and an anchor. The airbelt can include a bag and a mesh webbing covering the bag in which the airbelt is expanded by gas introduced into the bag. The anchor can be connected to a tip end of the airbelt, and an opening may be provided in the anchor. The tip end of the airbelt can be inserted into the opening and folded back so as to overlap onto a base end side of the airbelt, and the tip end side and the base end side of the airbelt may be stitched together. A tip end side of the mesh webbing may extend out more than a tip end of the bag, and only the tip end side of the mesh webbing is inserted into the opening.

Also, the tip end portion of the mesh webbing situated nearer the tip end of the mesh webbing in relation to the opening can be stitched on the bag and the mesh webbing at the base end side of the airbelt. The airbelt can further include a webbing whose one end is connected to rear end sides of the mesh webbing and the bag. The rear end side of the mesh webbing can extend out relatively longer toward the webbing in relation to the rear end side of the bag, and the mesh webbing may be stitched on the webbing at a portion in the mesh webbing, which is spaced apart from the rear end side of the bag at a predetermined distance.

According to another embodiment of the present invention, an airbelt apparatus can comprise an airbelt and an anchor. The airbelt can comprise a webbing, a bag following the webbing, and a mesh webbing covering the webbing and the bag, wherein the airbelt may be expanded by gas introduced into the bag. The anchor can be connected to a tip end of the airbelt and may include an opening in the anchor. The tip end of the airbelt can be inserted into the opening and folded back so as to overlap onto a base end side of the airbelt. Then, the tip end side and the base end side of the airbelt are stitched together. The rear end sides of the mesh webbing and the bag may be stitched together on a middle portion in a longitudinal direction of the webbing. The tip end sides of the webbing and the mesh webbing can extend out more than a tip end of the bag. Only the tip end sides of the webbing and the mesh webbing are inserted into the opening.

Also, a tip end portion of the mesh webbing situated nearer the tip end of the mesh webbing in relation to the opening can be stitched on the webbing, the bag and the mesh webbing at the base end side of the airbelt. The webbing can extend through the inside of the bag. The rear end side of the mesh webbing can extend out longer toward a rear end side of the webbing in relation to a rear end side of the bag. The mesh webbing and the webbing are stitched together at a portion in the mesh webbing spaced apart from the rear end side of the bag at a predetermined distance.

The stitching work for the mesh webbing and the webbing can be performed such that a seam of the stitching work substantially extends in a direction across a longitudinal direction of the mesh webbing.

The stitching work for the tip end side of the mesh webbing and the base end side of the airbelt can be performed such that a seam of the stitching work substantially extends in the direction across the longitudinal direction of the mesh webbing.

A protecting cover for surrounding the airbelt and/or a gas generator can also be included in the airbelt apparatus.

According to one embodiment of the present invention, only mesh webbing is inserted into an opening of the anchor. Accordingly, the opening can be constructed to have a smaller size compared to a situation in which both the mesh webbing and a bag are inserted into the opening. Further, by forming the opening to have a smaller size, the anchor can also be formed to have a smaller size.

Also, the anchor can be provided for fastening an end portion of the airbelt, and the anchor may be either a lap anchor or a tongue.

In the case where the bag is expanded, the mesh webbing that covers the bag can also be expanded following the expansion of the bag. The mesh webbing may be constructed with a knitted fabric that can be flexibly extended in a widening or an expanding direction but cannot be practically extended in a longitudinal direction. Accordingly, the mesh webbing can have a small size in the longitudinal direction thereof when expanded, and apply tension force to the airbelt.

The stitching strength of a tip end portion of the mesh webbing to a base end side of the airbelt can be relatively high.

The airbelt may have a construction in which one end of the webbing formed from a belt material similar to an ordinary seatbelt or the like is connected to a rear end side of the mesh webbing and the bag. In this case, by inserting the webbing into the anchor (for example, a tongue) at a rear end side of the airbelt, the opening of the anchor at the rear end side of the airbelt can also be enabled to have a smaller size. As a result, the anchor at the rear end side of the airbelt can also be a smaller size.

The rear end side of the mesh webbing can extend out longer toward a webbing side in relation to the rear end side of the bag. Further, the mesh webbing may be stitched on the webbing at a portion in the mesh webbing spaced apart from the rear end side of the bag at a predetermined distance.

In a case that the bag is expanded, although the bag itself is contracted in a longitudinal direction thereof, usually a contracting amount of the mesh webbing in a longitudinal direction at a time of expansion of the mesh webbing can be greater than a contracting amount of the bag in the longitudinal direction at the time of expansion of the bag. Accordingly, in a case that the bag and the mesh webbing are expanded together, the rear end side of the mesh webbing approaches the rear end side of the bag, because of the difference between the contracting amounts of both the bag and the mesh webbing. Consequently, a portion between each of the rear end side of the mesh webbing and the rear end side of the bag in the webbing can be brought to a loose condition.

In general, when tension force is applied to an airbelt, and an expanded bag is stretched by the tension force, the thickness of the expanded bag is brought to a smaller size. Accordingly, the thickness of the mesh webbing extended along the expansion of the bag also becomes smaller. As a result, the length of the mesh webbing becomes large, and the tension force applied to the airbelt from the mesh webbing becomes small.

In contrast, in one embodiment of the present invention, in a condition in which both the bag and the mesh webbing are expanded, because a portion of the webbing between the rear end side of the mesh webbing and the rear end side of the bag is loosened, even when the tension force is applied to the airbelt, the tension force is not imparted to the bag. Therefore, there is no possibility that the bag is stretched by the tension force. Consequently, the thickness of the expanded bag is prevented from being reduced, or its reduction is suppressed. As a result, the tension force applied to the airbelt from the mesh webbing is prevented from being reduced, or its reduction is suppressed.

In one embodiment because only the mesh webbing and the webbing can be caused to be inserted into the opening of the anchor, the opening of the anchor can be enabled to have a smaller size compared to a case in which the bag is also inserted into the opening.

In general, a knitted fabric that makes up the mesh webbing can be knitted such that a plurality of pieces of knitting yarn align in a manner so as to be in parallel with a longitudinal direction of the mesh webbing, and that a distance between each of the pieces of knitting yarn can easily be expanded. Accordingly, when the stitching work for the mesh webbing and the webbing, or the stitching work for a tip end side of the mesh webbing and a base end side of the airbelt is performed in a manner such that a stitching thread is extended in a direction in parallel with a longitudinal direction of the mesh webbing, the stitching thread tends to get between each of the pieces of knitting yarn. When the stitching thread gets between each of the pieces of knitting yarn, a width of the mesh webbing is increased, and a dimensional error occurs between the designed value and that of the real product.

Therefore, as described in one embodiment of the present invention, it can be preferable that the stitching work for the mesh webbing and the webbing, or the stitching work for the tip end side of the mesh webbing and the base end side of the airbelt is performed such that the seam substantially extends in a direction across the longitudinal direction of the mesh webbing. By performing the stitching work for the mesh webbing in this matter, it becomes harder for the stitching thread to get between each of the pieces of knitting yarn of the mesh webbing. As a result, the width of the actually manufactured mesh webbing can be prevented from becoming larger or suppressed from becoming larger than that of the designed value.

Incidentally, the words "a seam of the stitching work substantially extends in a direction across the longitudinal direction of the mesh webbing" can refer to the seam that extends in a direction orthogonal to the longitudinal direction of the mesh webbing, or that extends at an angle of inclination with respect to the direction orthogonal to the longitudinal direction of the mesh webbing. The angle of inclination can be 10° or less, specifically, 4° or less. However, when a part of the seam is 10% or less of an entire length of the seam, specifically, 4.7% or less, that part of the seam may also be partially extended in the longitudinal direction of the mesh webbing.

Additionally, the mesh webbing can be protected by a protecting cover.

It is to be understood that both the foregoing general description and the following detailed descriptions are exemplary and explanatory only, and are not restrictive of the invention as claimed.

BRIEF DESCRIPTION OF THE DRAWINGS

The features, aspects, and advantages of the present invention will become apparent from the following description, the appended claims, and the accompanying exemplary embodiments shown in the drawings, which are briefly described below.

FIG. 6(*a*) is a top plan view of the airbelt apparatus according to still another embodiment of the present invention with the protecting cover and the mesh webbing removed, FIG. 6(*b*) is a top plan view of the airbelt apparatus of FIG. 6(*a*) in which the bag is expanded, and FIG. 6(*c*) is a side view of FIG. 6(*b*) as indicated by arrows C-C.

FIGS. 7(*a*) to 7(*d*) show the construction of the airbelt apparatus of FIGS. 6(*a*) through 6(*c*). FIG. 7(*a*) is a plan view of the bag flatly expanded, FIG. 7(*b*) is a plan view of the bag attached to the webbing, FIG. 7(*c*) is a cross-sectional view taken along C-C line in FIG. 7(*a*), and 7(*d*) is a cross-sectional view taken along D-D line in FIG. 7(*b*).

FIG. 8(*a*) is a top plan view of the airbelt apparatus according to still another embodiment of the present invention in which the protecting cover and the mesh webbing are removed, and FIG. 8(*b*) is a top plan view in which the bag of FIG. 8(*a*) is expanded.

FIGS. 9(*a*) and 9(*b*) are enlarged views of the knitting structure of the mesh webbing. FIG. 9(*a*) shows a condition in which the mesh webbing is not extended in a width direction, and FIG. 9(*b*) shows a condition in which the mesh webbing is extended in the width direction.

FIGS. 10(*a*) through 10(*c*) are views of different stitching work for the mesh webbing according to various embodiments of the present invention.

DETAILED DESCRIPTION

Various embodiments of the present invention will be explained with reference to the accompanying drawings.

Figure 1A:
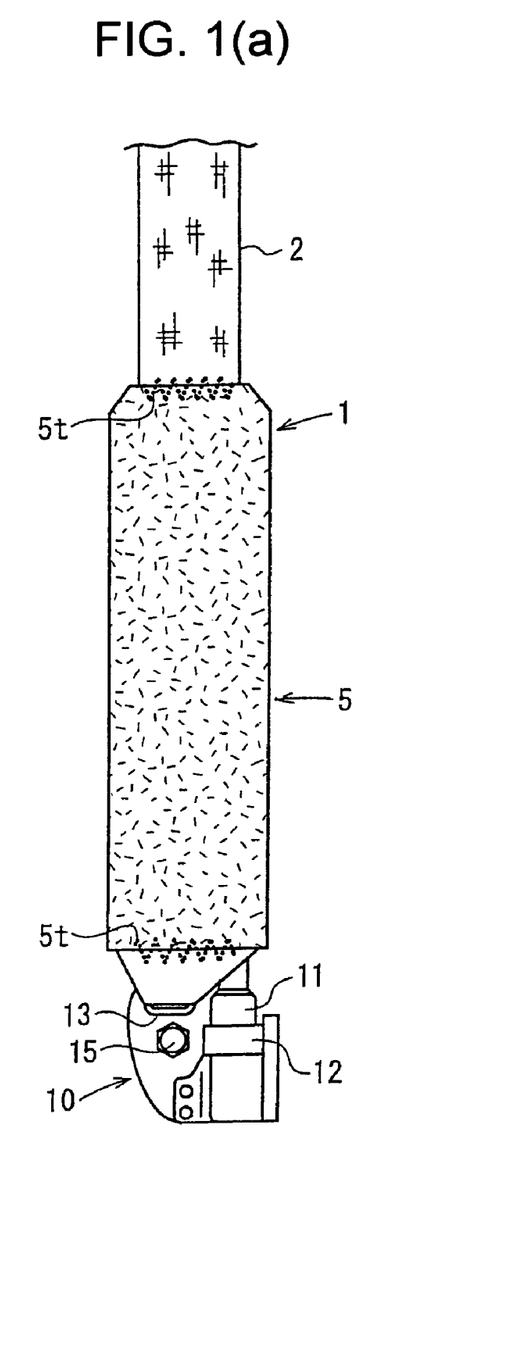
FIG. 1(a) is a top plan view of an airbelt apparatus according to an embodiment of the present invention.
Figure 1B:
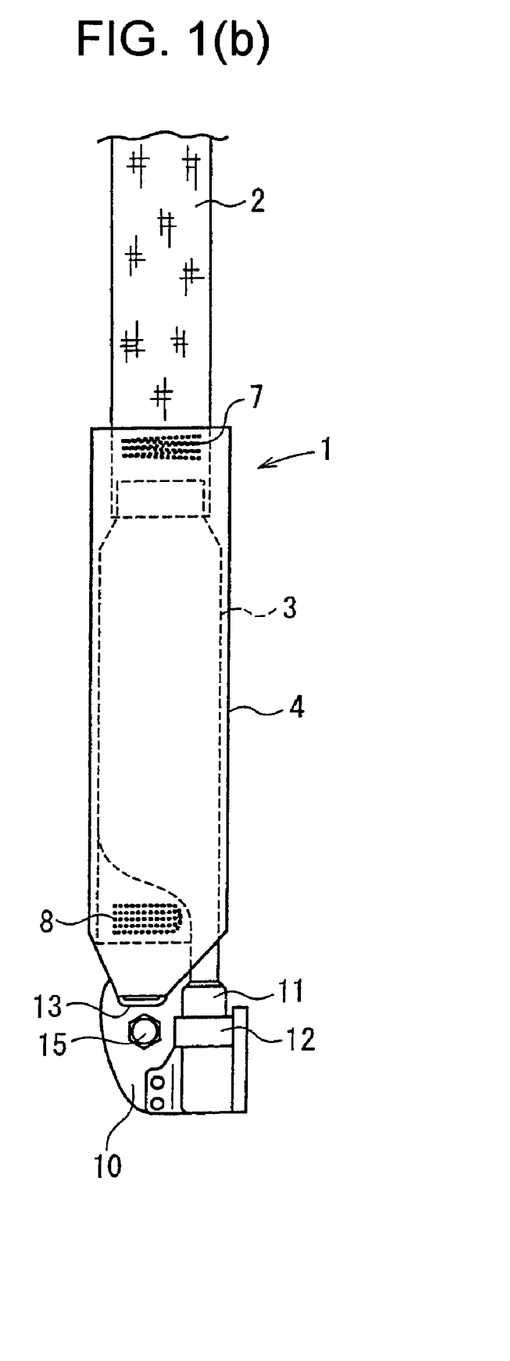
FIG. 1(b) is a top plan view of the airbelt apparatus in which the protecting cover is removed.
Figure 2A:
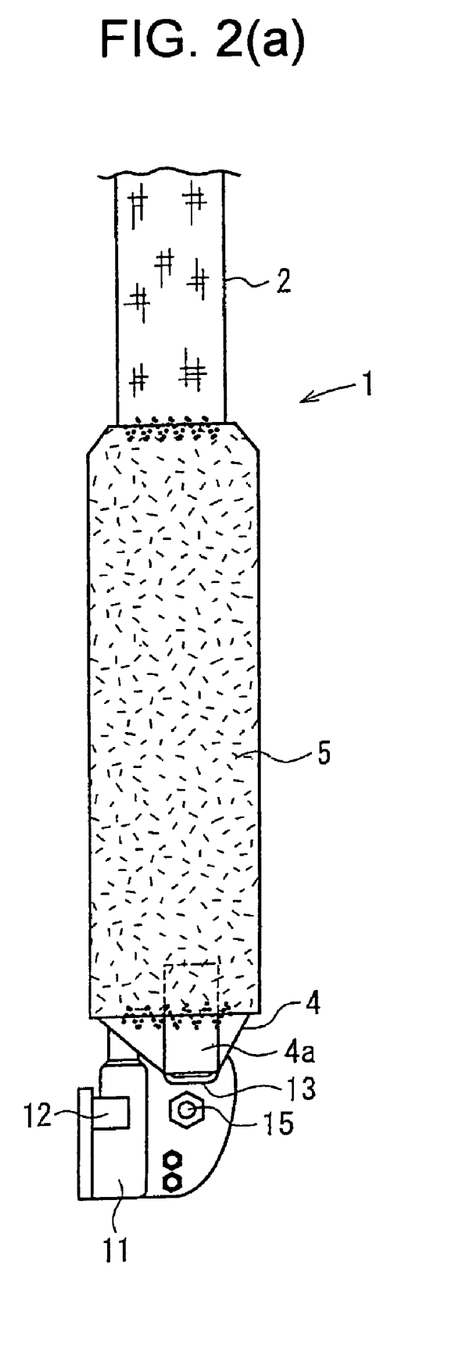
FIG. 2(a) is a bottom plan view of the airbelt apparatus of FIG. 1(a)
Figure 2B:
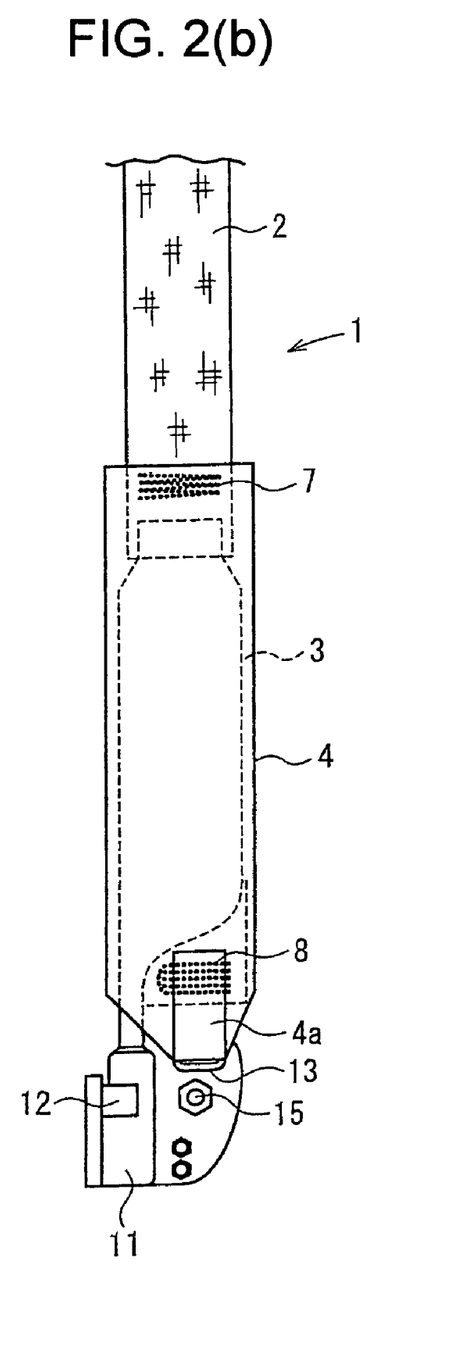
FIG. 2(b) is a bottom plan view of the airbelt apparatus in which the protecting cover is removed.
Figure 3A:
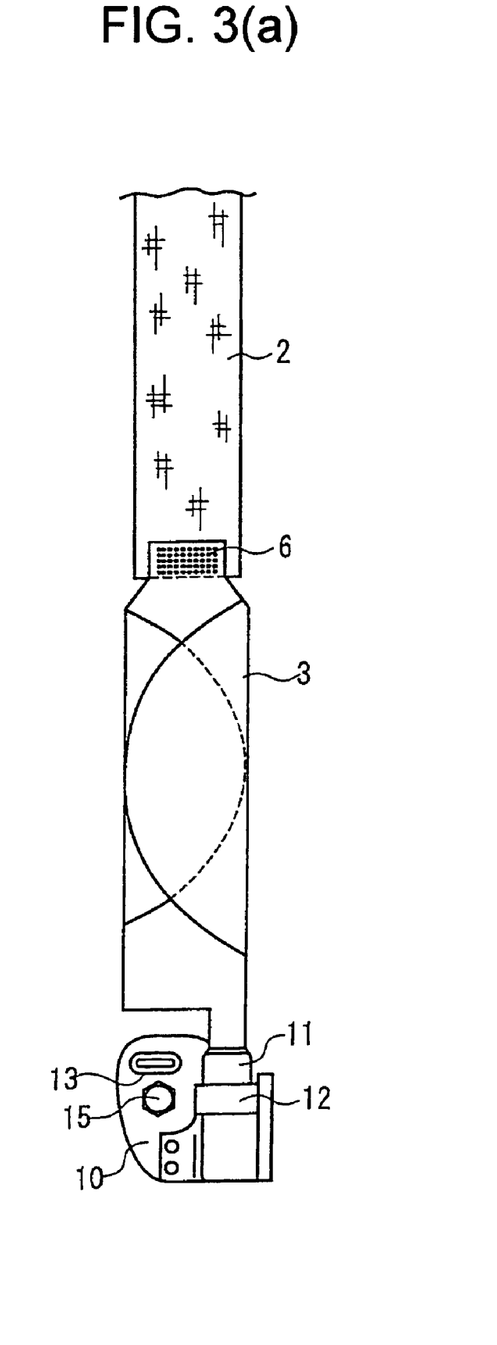
FIG. 3(a) is a top plan view of an airbelt apparatus in which the protecting cover and the mesh webbing are detached.
Figure 3B:
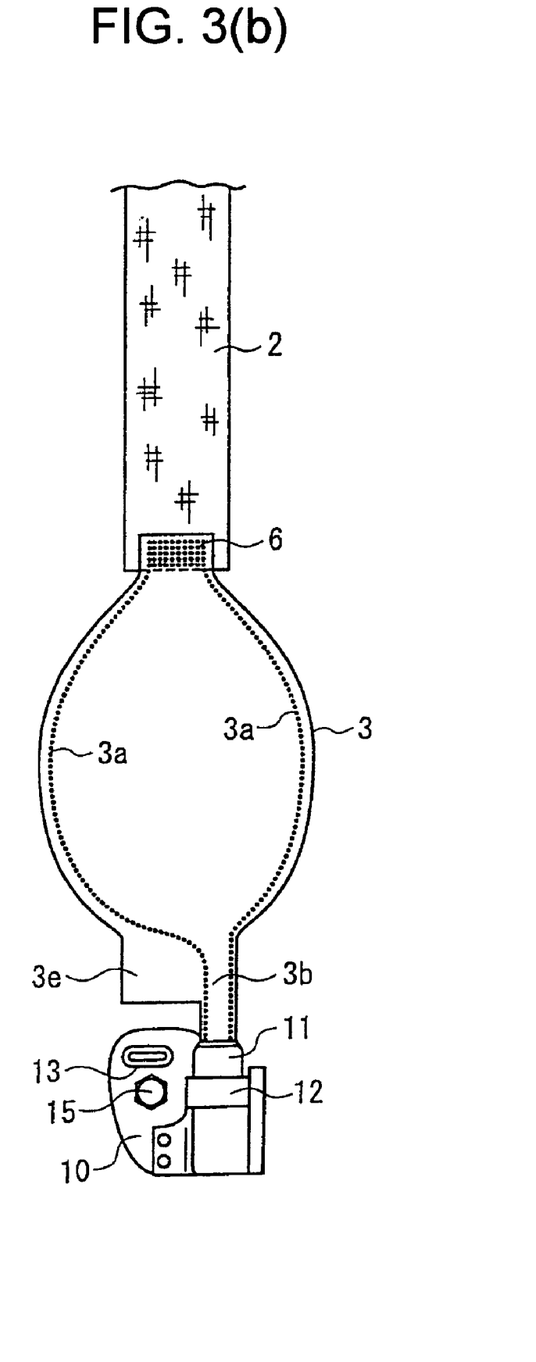
FIG. 3(b) is a top plan view of the bag of FIG. 3(a) flatly expanded.

FIGS. 1 through 3 are plan views showing an airbelt apparatus according to one embodiment of the present invention. FIG. 1(*a*) is a top plan view showing the airbelt apparatus, and FIG. 1(*b*) is a top plan view showing the airbelt apparatus in which the protecting cover is removed, FIG. 2(*a*) is a bottom plan view showing the airbelt apparatus, FIG. 2(*b*) is a bottom plan view showing the airbelt apparatus in which the protecting cover is removed, and FIGS. 3(*a*) and 3(*b*) are plan views showing the airbelt apparatus in which the protecting cover and mesh webbing are removed.

The airbelt apparatus can be constructed by connecting the airbelt 1 to a lap anchor 10, which serves as an anchor.

The airbelt 1 can be provided with a webbing 2, a bag 3, a mesh webbing 4, and a protective cover 5. The webbing 2 can be formed from a non-expansion type ordinary belt material. The bag 3 can have a rear end side stitched on a tip end of the webbing 2 with a seam 6 (refer to FIG. 3). The mesh webbing 4 can surround the bag 3. The protecting cover 5 can cover approximately the entire mesh webbing 4 and a tip end side of the webbing 2.

The bag 3 is a bag formed by means of overlapping a plurality of sheets of base cloth and stitching a peripheral edge portion of the portion of the overlapping base cloth sheets with a seam 3*a* to form a bag-like shape. A maximum width of the base cloth can be greater than that of the webbing 2.

Most of the seam 3*a* of the bag 3 can be located along an outer peripheral edge of the bag 3. However, the seam 3*a* may be separated from the outer peripheral edge at a tip end side of the bag 3. An extended-out portion 3*e* (refer to FIG. 3(*b*)) into which gas is not introduced can be formed between the seam 3*a* and the tip end of the bag 3.

As shown in FIG. 3, the bag 3 can be formed to have a belt-like shape in approximately the same width as that of the webbing 2 by folding back both sides of the bag. A gas-introducing inlet 3*b* formed at the tip end side of the bag 3 may be connected to an inflator 11. The inflator 11 can be fixed to the lap anchor 10 by a holding member 12. The gas-introducing inlet 3*b* could be outfitted on, for example, a gas blowing outlet of the inflator 11, and can be connected to the inflator 11 by tightening a band (not shown) around the outer periphery.

When each of the base cloths constituting the bag 3 is stitched together with the seam 3*a*, the stitching work can be performed in such a manner that a slight gas leak from between each of the base cloths is allowed. Further, a connecting structure of the gas-introducing inlet 3*b* and the inflator 11 can be constructed in such a manner that a slight gas leak from between them is also allowed. Alternatively, a vent hole (not shown) may be provided in the bag 3 instead of causing the gas to leak from between each of the base cloths, or from the connecting portion of the gas-introducing inlet 3*b* and the inflator 11.

The mesh webbing 4 can cover the belt-shaped folded-back bag 3. The mesh webbing 4 can be constructed with a knitted fabric that can be flexibly extended in a widening or an expanding direction but cannot be practically extended in a longitudinal direction.

A rear end side of the mesh webbing 4 is stitched on a portion of the webbing 2 in the vicinity of the tip end of the webbing 2 with a seam 7. The seam 6 can be positioned at a leading edge portion of the webbing 2. The seam 7 can be slightly spaced apart from the leading edge portion of the webbing 2.

A tip end side of the mesh webbing 4 serves as a thin width portion 4*a* (refer to FIG. 2). Only the thin width portion 4*a* is inserted into an opening 13 of the lap anchor 10 and folded back. The tip end side of the thin width portion 4*a* is overlapped onto a base end side of the mesh webbing 4, and stitched together with a seam 8. The base end side of the mesh webbing can refer to a portion situated nearer to the bag 3 side in relation to the opening 13. The position where the tip end side of the thin width portion 4*a* is overlapped is a portion of the extended-out portion 3*e* of the bag 3. The thin width portion 4*a* is stitched with a seam 8 on the base end side of the mesh webbing 4 and the extended-out portion 3*e*.

As clearly shown in FIG. 3, the extended-out portion 3*e* is slightly spaced apart from the lap anchor 10, and the bag 3 is not inserted into the opening 13. Only the thin width portion 4*a* of the mesh webbing 4 is inserted into the opening 13.

The protecting cover 5 can be a cover formed from a sheet-shaped material having a thin long rectangular shape. The sheet-shaped material can be folded and stitched with a tear seam (not shown) into a cylindrical shape. The tear seam can be provided with strength to the extent of being able to be torn when the bag 3 is expanded.

The protecting cover 5 can extend in an area from the tip end of the webbing 2 to a position closest to the lap anchor 10. A rear end side of the protecting cover 5 can cover the seam 7 and can be stitched on the webbing 2 with a tear seam 5*t*. A tip end side of the protecting cover 5 can cover the seam 8 but the tip end side is slightly spaced apart from the lap anchor 10. The tip end side of the protecting cover 5 can also be stitched on the mesh webbing 4 with the tear seam 5*t*. The tear seam 5*t* can also provided with the strength to the extent of being able to be torn when the bag 3 is expanded.

A lap airbelt 1 can be an airbelt that is pulled around an abdominal area of an occupant seated in an automobile seat. The lap anchor 10 can be attached to a seat side frame (not shown) by a holding-on clamp 15 such as a bolt or the like.

Although not shown, in the middle of the webbing 2, a tongue similar to that in an ordinary seatbelt apparatus can be inserted. A rear end side of the webbing 2 is retractably connected to a seatbelt retractor after passing through a shoulder anchor.

Because only the mesh webbing 4 can be inserted into the opening 13 of the lap anchor 10 as described above, the opening 13 can be designed to have a smaller size compared to the case where both the mesh webbing 4 and the bag 3 are inserted into the opening 13. Thus, the lap anchor 10 can be designed to have a smaller size as a result.

When an automobile on which the airbelt apparatus is constructed as described above encounters a collision, the inflator 11 is activated to blow out gas, and the bag 3 is thus expanded resulting in the restraint of the occupant. The bag 3 can be brought to have a relatively short length when expanded. Further, the mesh webbing 4 is also expanded along with the expansion of the bag 3. The mesh webbing 4 is also brought to have a relatively short length along with the expansion of the mesh webbing 4 because the mesh webbing 4 is constructed with a knitted fabric that can be flexibly extended in a widening or an expanding direction but cannot be practically extended in a longitudinal direction. As a result, the tension force is applied to the webbing 2 and an occupant is restrained on a seat. Further, at this moment, the shock applied to the occupant is absorbed by the leaking of the gas from between each of the base cloths constituting the bag 3, or from the connecting portion of the gas-introducing inlet 3b and the inflator 11.

In the lap airbelt 1, because the bag 3 is wrapped up by the mesh webbing 4, the compression strength of the bag 3 at the time of expansion is high. Further, because the length of the mesh webbing 4 and the length of the bag 3 itself are shortened when the bag 3 is expanded, the tension force can effectively be applied to the lap airbelt 1.

Figure 4A:
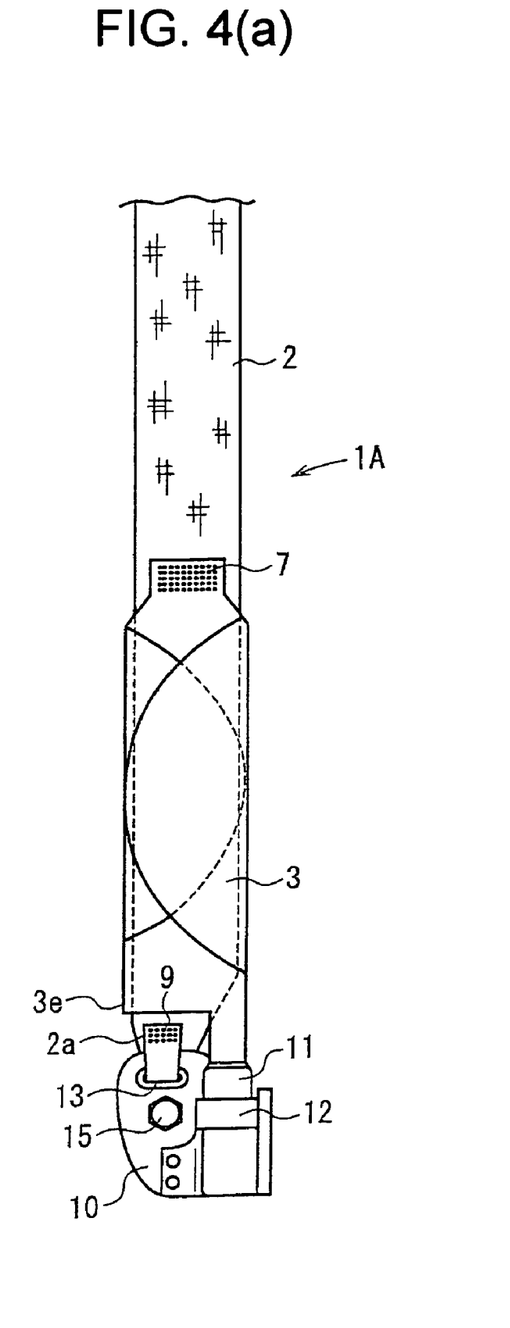
FIG. 4(a) is a top plan view of the airbelt apparatus according to another embodiment of the present invention with the protecting cover and the mesh webbing removed.
Figure 4B:
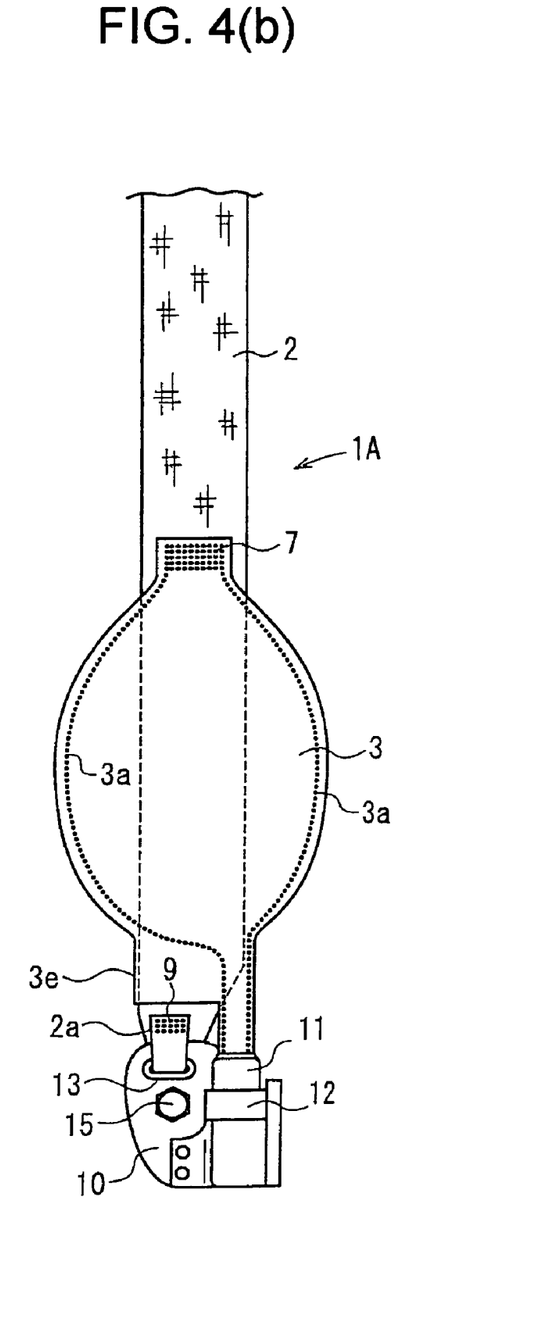
FIG. 4(b) is a top plan view of a condition in which the bag of FIG. 4(a) is flatly expanded.
Figure 5:
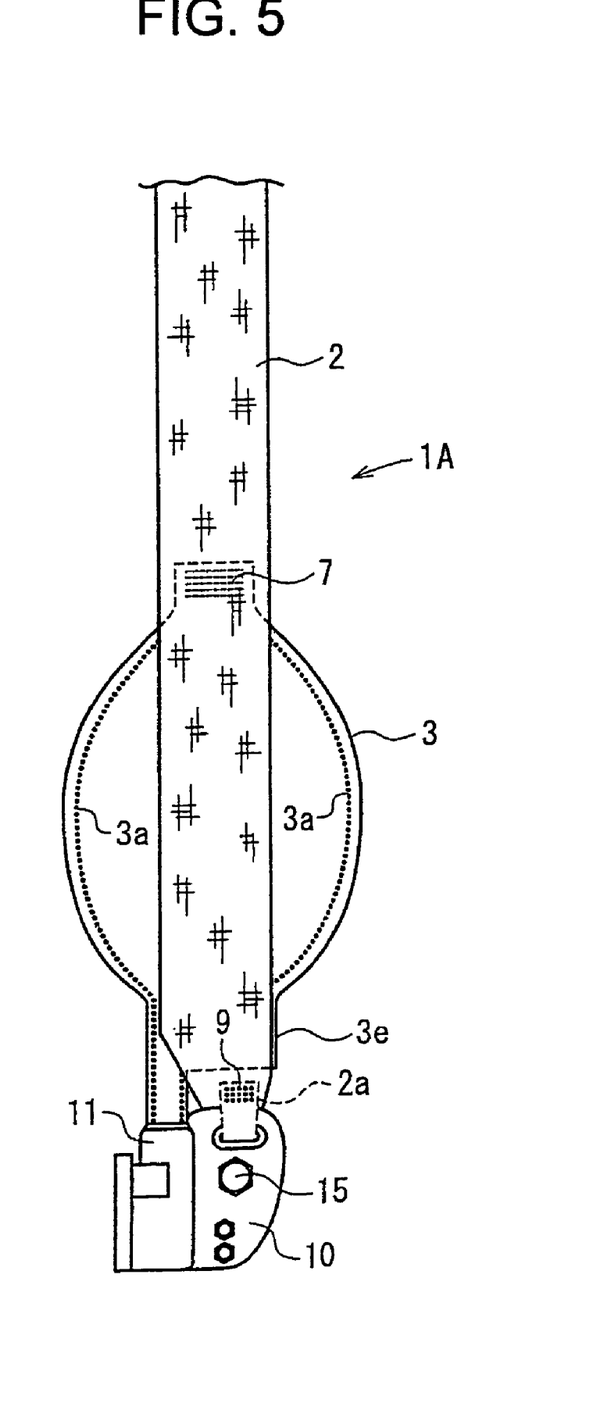
FIG. 5 is a bottom plan view of the airbelt apparatus of FIG. 4(b).

FIGS. 4 and 5 show another embodiment of the present invention. FIG. 4(a) is a top view showing an airbelt apparatus with the protecting cover and the mesh webbing removed. FIG. 4(b) is a top plan view showing the airbelt apparatus of FIG. 4(a) in which the bag is flatly extended. FIG. 5 is a bottom plan view of the airbelt shown in FIG. 4(b).

In the embodiment shown in FIGS. 1 though 3, only the mesh webbing 4 is inserted into the opening 13 of the lap anchor 10; however, the embodiment shown in FIGS. 4 and 5 is configured such that the mesh webbing 4 and the webbing 2 are inserted into the opening 13.

In a lap airbelt 1A of FIGS. 4(a) and 4(b), the webbing 2 may be also extended up to the lap anchor 10, and the bag 3 is disposed in the middle of the webbing 2 in an extending direction of the webbing 2. That is, the webbing 2 can be extended in a manner so as to be overlapped onto the bag 3, and a tip end portion 2a of the webbing 2 may be extended out from a tip end of the bag 3. The tip end portion 2a of the webbing 2 can be formed to have a thin width shape so that the tip end portion 2a can be inserted into the opening 13, and is extended up to a leading edge of the mesh webbing 4. The tip end portion 2a of the webbing 2 can be inserted into the opening 13 and folded back, and is stitched on a base end side of the webbing 2 with a seam 9.

Although not shown, a tip end portion 4a of the mesh webbing 4 can also be inserted into the opening 13 in the same manner as that shown in FIGS. 1 through 3, and the tip end portion 4a can be stitched on the base end side of the mesh webbing 4 with the seam 8. The stitching position of the seam 8 is the same as that in the embodiment of FIGS. 1 through 3, and the extended-out portion 3e of the bag 3, the webbing 2, and the mesh webbing 4 can be stitched together with the seam 8. Although not shown, in this embodiment, the protecting cover 5 may also be mounted on in the same manner as that shown in FIGS. 1 and 2.

The rest of the construction of the embodiment of FIGS. 4 and 5 is the same as that in the embodiment shown in FIGS. 1 through 3, and the same numerals in FIGS. 4 and 5 as those in FIGS. 1 through 3 denote the same elements.

Because only the mesh webbing 4 and the webbing 2 are inserted into the opening 13, the opening 13 can be designed to have a smaller size compared to the case where the mesh webbing 4, the webbing 2, and the bag 3 are inserted into the opening 13, and thus the lap anchor 10 can also be designed to have a smaller size.

In the lap airbelt 1A of FIGS. 4(a) and 4(b), the bag 3 can also be wrapped up by the mesh webbing 4, and therefore the compression strength of the bag 3 at the time of expansion can be high. Further, because the length of the mesh webbing 4 and the length of the bag 3 itself are relatively shortened when the bag 3 is expanded, the tension force can effectively be applied to the lap airbelt 1A.

When the inflator 11 is activated to blow out the gas and the bag 3 is expanded, the length of the bag 3 itself and the length of the mesh webbing 4 that is expanded along the expansion of the bag 3 are also relatively shortened, and the tension force is generated in the webbing 2. At this moment, the portion between the seams 7 and 8 in the webbing 2 is shortened by the bag 3 and the mesh webbing 4, in which the lengths thereof are shortened by the expansion, and is brought to a loose condition.

When the lap airbelt 1A restrains a movement of the occupant, the tension force works on the lap airbelt 1A, and the bag 3 and the mesh webbing 4 are stretched by the tension force. Along with this operation, the distance between the seams, 7 and 8, is extended, and finally, the looseness of the portion between the seams 7 and 8 in the webbing 2 is removed. As a result, the lap airbelt 1A (the bag 3 and the mesh webbing 4) is prevented from being extended further.

In the lap airbelt 1A, the shock applied to the occupant is also absorbed by the leaking of the gas from the stitching portion of each of the base cloths of the bag 3, and the connecting portion of the gas-introducing inlet 3b and the inflator 11.

In a case in which the tip end side of the webbing 2 is connected to a rear end side of the bag 3 and the mesh webbing 4, the internal pressure of the bag 3 is required to be raised so that the lap airbelt 1A is prevented from being extended or its extension is suppressed by a predetermined length or more, when the occupant is restrained. In contrast, in the lap airbelt 1A in which the tip end side of the webbing 2 is connected to the lap anchor 10, the webbing 2 is brought to a strained condition (i.e., a condition of being stretched without looseness) even when the internal pressure of the bag 3 at a time of the expansion is relatively low. Therefore, the ability of the lap airbelt 1A to extend is limited by a predetermined length or more. Accordingly, the internal pressure of the bag 3 at the time of expansion can be set to be relatively low. Further, as a result, an inflator having relatively low output can be adopted as the inflator 11.

In addition, when the webbing 2 is brought into the strained condition, the lap airbelt 1A opposes the tension force by the webbing 2. Accordingly, it is sufficient that the required strength of the seams 6 through 9, which stitch the bag 3 and the mesh webbing 4 on the webbing 2, is low compared to the case in which the tip end side of the webbing 2 is connected to the rear end side of the bag 3 and the mesh webbing 4. Therefore, the stitching work for the bag 3 and the mesh webbing 4 on the webbing 2 can also be simplified.

Figures 6A, 6B:
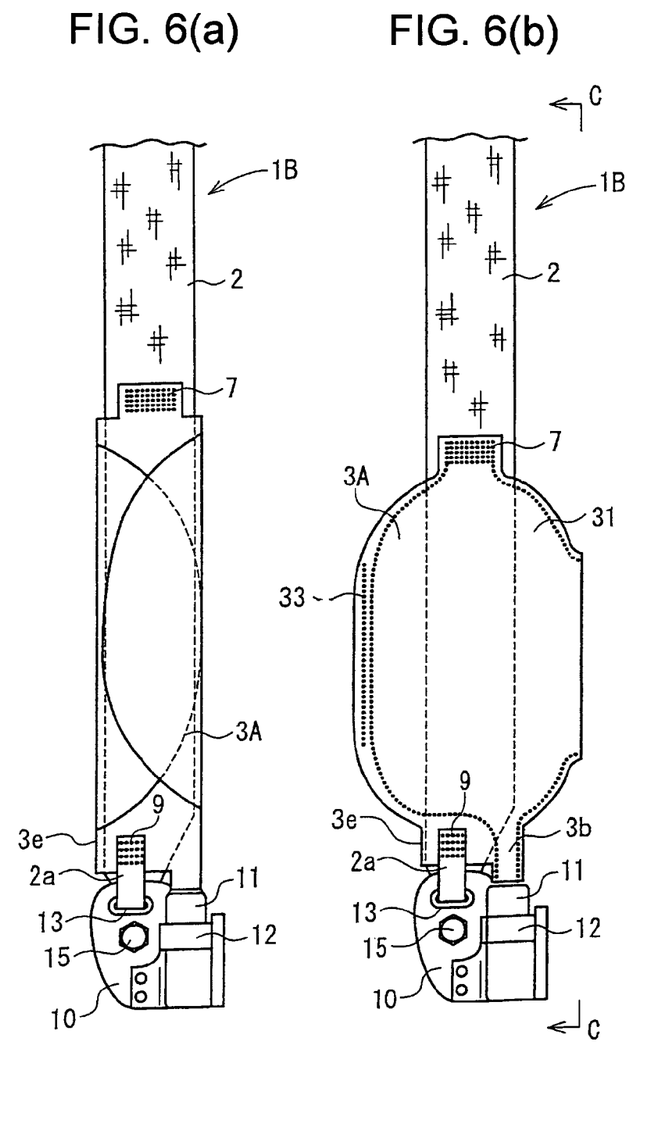
Figure 6C:
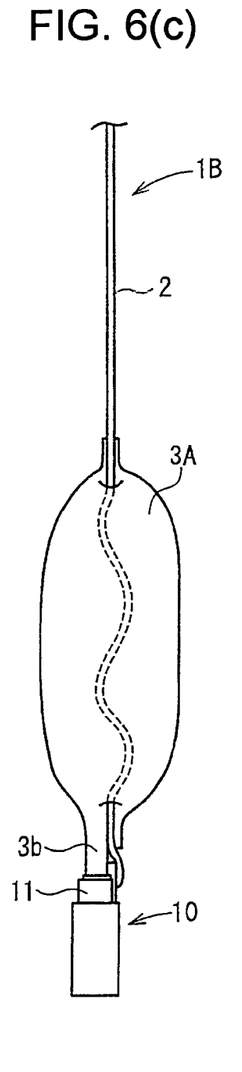
Figure 7A:
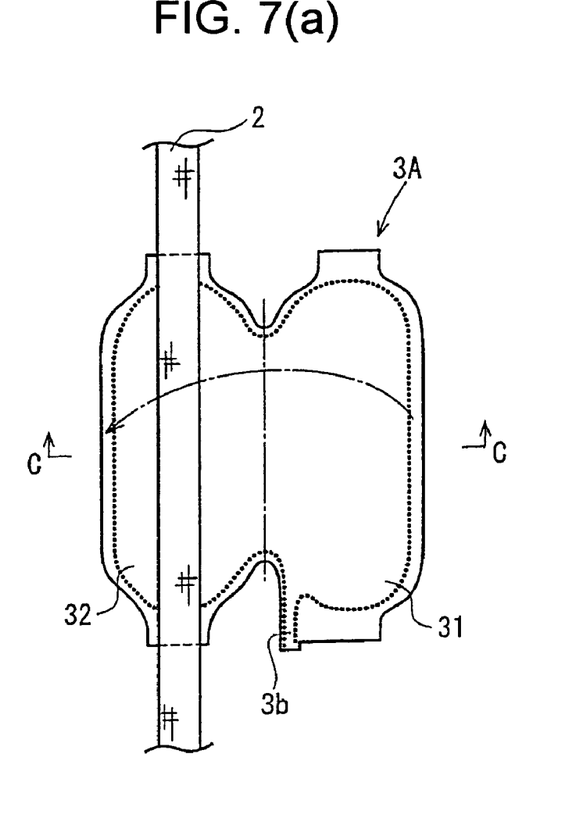
Figure 7B:
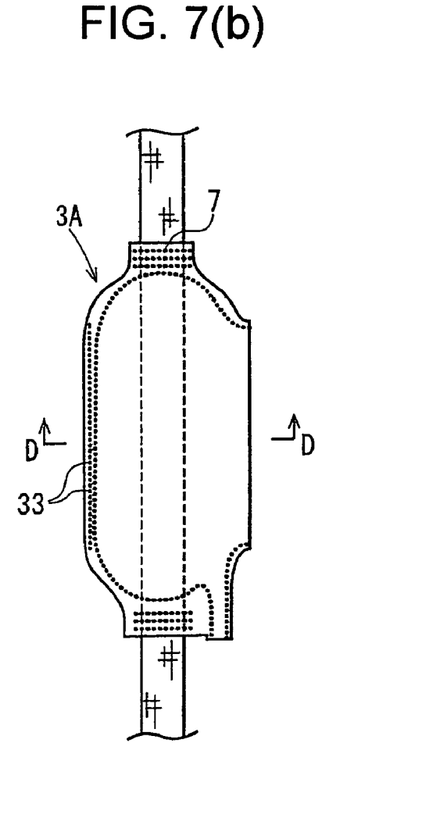
Figure 7C:
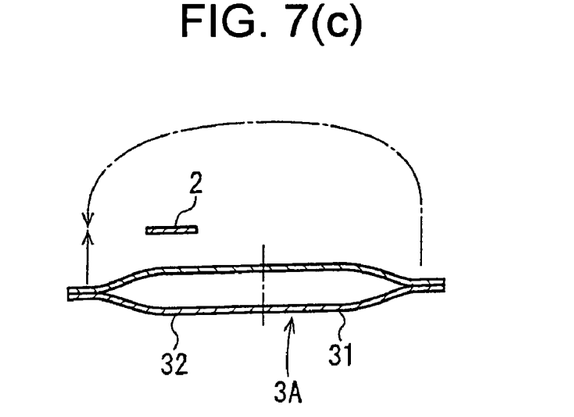
Figure 7D:
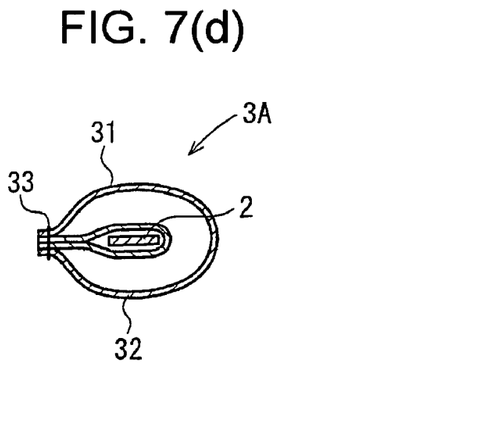

FIG. 6(a) is a top plan view showing the airbelt apparatus with respect to still another embodiment of the present invention with the protecting cover and the mesh webbing removed. FIG. 6(b) is a top plan view showing the airbelt apparatus of FIG. 6(a) in which the bag is expanded. FIG. 6(c)

is a side view of FIG. 6(b) as indicated by arrows C-C. FIGS. 7(a) through 7(d) are plan views and cross-sectional views showing the construction of the bag. FIG. 7(a) shows the bag being flatly expanded. FIG. 7(b) shows a condition of the bag attached in a manner so as to surround both the webbing at an occupant side and the webbing at a side opposite to the occupant. FIG. 7(c) is a cross-sectional view taken along C-C line in FIG. 7(a) while FIG. 7(d) is a cross-sectional view taken along D-D line in FIG. 7(b).

A lap airbelt 1B of this embodiment is constructed such that a bag 3A for continuously surrounding the webbing 2 from an occupant side to a side opposite to the occupant is provided.

The bag 3A can be provided with an occupant-side disposition portion 31 disposed at the occupant side of the webbing 2 and an opposite-side disposition portion 32 disposed at a side opposite to the occupant side of the webbing 2. As shown in FIG. 7(a), the occupant-side disposition portion 31 can have a construction similar to that of the bag 3 in the embodiments of FIGS. 1 through 3 and FIGS. 4 and 5. The opposite-side disposition portion 32 has a construction such that the gas-introducing inlet 3b is omitted from the construction of the occupant-side disposition portion 31. Further, the occupant-side disposition portion 31 and the opposite-side disposition portion 32 can be integrally formed via an intermediate portion that connects each of one side edge of the portions 31 and 32, and are allowed to communicate with each other via the intermediate portion.

When the bag 3A is attached to the webbing 2, as shown in FIGS. 7(a) through 7(d), the bag 3A can be folded in folio at a portion between the occupant-side disposition portion 31 and the opposite-side disposition portion 32 (e.g., the intermediate portion) from a flatly developed condition. The webbing 2 can be sandwiched between the occupant-side disposition portion 31 and the opposite-side disposition portion 32, and each of the facing edges of the occupant-side disposition portion 31 and the opposite-side disposition portion 32 is stitched together with a seam 33. Then, each of the rear end sides of the occupant-side disposition portion 31 and the opposite-side disposition portion 32 is stitched together on the webbing 2 with the seam 7. Thus, the bag 3A can be formed to have a cylindrical shape, and the webbing 2 is configured to be pulled through the inside of the bag 3.

In this embodiment, when the tip end portion 2a of the webbing 2 is inserted into the opening 13 of the lap anchor 10 and folded back, and stitched on the base end side of the webbing 2 with the seam 9, the extended-out portion 3e at a tip end side of the bag 3A (occupant side disposition portion 31) is also stitched together.

As shown in FIG. 6(a), the bag 3A is formed to have a belt like shape in approximately the same width as that of the webbing 2 when both sides of the bag 3A are folded back. Further, although the illustration is omitted, the mesh webbing 4 is mounted in such a manner so as to wrap an entire periphery of the bag 3A.

The rest of the construction of the embodiment of FIGS. 6 and 7 is the same as that in the embodiment shown in FIGS. 4 and 5, and the same numerals in FIGS. 6 and 7 denote the same elements in FIGS. 4 and 5.

In this lap airbelt 1B, because the bag 3A is continuously expanded from the occupant side of the webbing 2 to the side opposite to the occupant side of the webbing 2, the occupant-protecting effect is high.

It is natural to say that in the lap airbelt 1B, the same operational advantage as that of the lap airbelt 1A, shown in FIGS. 4 and 5, is also obtained.

Figures 8A, 8B:
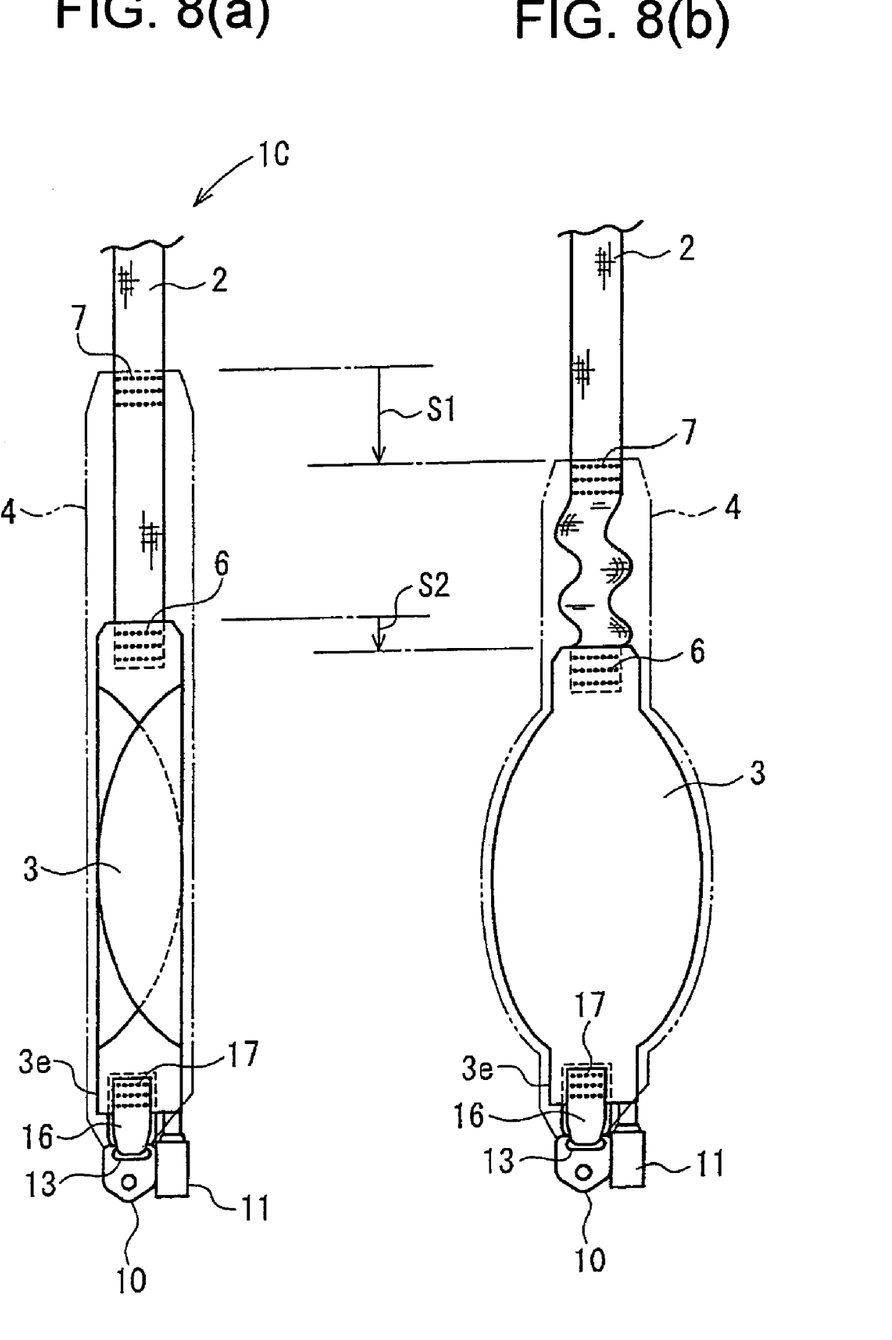

FIG. 8(a) is a top plan view showing an airbelt apparatus with respect to still a further embodiment of the present invention with the protecting cover and the mesh webbing removed. FIG. 8(b) is a top plan view of the airbelt apparatus of FIG. 8(a) in which the bag is expanded.

In a lap airbelt 1C, the tip end side of the webbing 2 can be stitched on the rear end side of the bag 3 with the seam 6. At the tip end side of the bag 3 (extended-out portion 3e), a rear end side of a combining webbing 16 for combining the bag 3 with the lap anchor 10 is stitched together.

The combining webbing 16 can be formed from a belt material constituting an ordinary seatbelt similar to the webbing 2. A tip end side of the combining webbing 16 can extend up to the leading edge of the mesh webbing 4. The tip end side of the combining webbing 16 can be inserted into the opening 13 of the lap anchor 10 and folded back, and may be stitched on a base end side of the combining webbing 16 with a seam 17.

In this embodiment, the rear end side of the mesh webbing 4 that wraps the bag 3 is extended out longer toward the rear end side of the webbing 2 in relation to a rear end of the bag 3 (seam 6). At a portion in the mesh webbing 4, which is spaced apart from a rear end of the bag 3 (seam 6) at a predetermined distance, the mesh webbing 4 and the webbing 2 are stitched together with the seam 7.

Although a detailed illustration is omitted, the tip end side of the mesh webbing 4 is inserted into the opening 13 of the lap anchor 10, and stitched on the base end side of the mesh webbing 4 in the same manner as that in the previously-described embodiments. The stitching position can also be the same as that in each of the previously-described embodiments.

The rest of the construction of the embodiment shown in FIG. 8 is the same as that in the embodiment shown in FIGS. 1 through 3, and the same numerals in FIG. 8 denote the same elements in FIGS. 1 through 3.

In this embodiment, because only the mesh webbing 4 and the combining webbing 16 are inserted into the opening 13, the opening 13 can be designed to have a relatively small shape, and the lap anchor 10 can also be designed to have a small shape.

Hereinbelow, the operation of the lap airbelt 1C of FIGS. 8(a) and 8(b) will be explained.

The mesh webbing 4 can be constructed with a knitted fabric that can be flexibly extended in a widening or an expanding direction but cannot be practically extended in a longitudinal direction. Accordingly, the mesh webbing 4 is reduced in size in a longitudinal direction when expanded along with the expansion of the bag 3, and is brought to apply a tension force to the lap airbelt 1C.

At this moment, although the bag 3 itself contracts in a longitudinal direction when expanded, a contracting amount S1 in a longitudinal direction of the mesh webbing 4 becomes greater than a contracting amount S2 in a longitudinal direction of the bag 3 at the time of expansion. Because the rear end side of the mesh webbing 4 (seam 7) is stitched on the webbing 2 while being spaced apart from the rear end of the bag 3 (seam 6) at the predetermined distance, in a case that the bag 3 and the mesh webbing 4 are expanded (as shown in FIG. 8(b)), the rear end of the mesh webbing 4 approaches the rear end of the bag 3 because of the difference between the contracting amounts S1 and S2. Consequently, a portion between each of the seams 6 and 7 in the webbing 2 becomes loose or slacken.

In general, when the expanded bag 3 is stretched by that tension force applied to a lap airbelt, the thickness of the expanded bag 3 is reduced. Accordingly, the thickness of the expanded mesh webbing 4 is also reduced along with the expansion of the bag 3. As a result, the length of the mesh webbing 4 is increased and the tension force applied to the lap airbelt from the mesh webbing 4 is reduced.

In contrast, in the lap airbelt 1C of the embodiment of FIG. 8, in a condition that the bag 3 and the mesh webbing 4 are expanded, because the portion between the rear end side of the mesh webbing 4 (seam 7) and the rear end side of the bag 3 (seam 6) in the webbing 2 is loosened, the tension force is not transmitted to the bag 3, even when the tension force is applied to the airbelt 1C. Thus, there is no possibility that the bag 3 is stretched by the tension force. Accordingly, the reduction of the thickness of the expanded bag 3 is prevented or suppressed. As a result, the reduction in the tension force applied to the lap airbelt 1C from the mesh webbing 4 is prevented or suppressed.

Also, in the lap airbelt 1C of FIG. 8, the same operational advantage as that of the above-described lap airbelt 1 in FIGS. 1 through 3 is obtained.

Although the tip side of the webbing 2 is connected to the rear end side of the bag 3 in the lap airbelt 1C of FIG. 8, the webbing 2 may be extended up to the lap anchor 10, and the tip end side of the webbing 2 may be inserted into the opening 13 of the lap anchor 10 as the lap airbelt 1A shown in FIGS. 4 and 5.

Figure 9A:
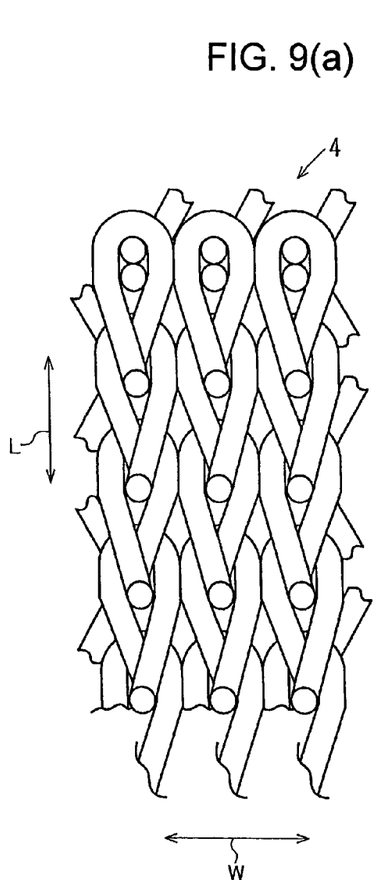
Figure 9B:
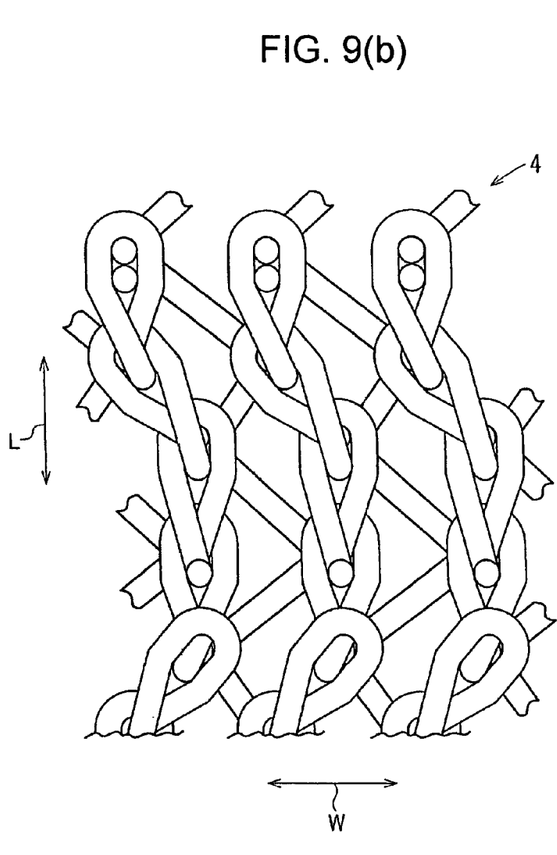

The mesh webbing 4 can be constructed with a knitted fabric that can be flexibly extended in a widening or an expanding direction but cannot be practically extended in a longitudinal direction. An enlarged illustration of a knitting structure of the mesh webbing 4 is shown in FIG. 9. FIG. 9(a) illustrates a condition in which the mesh webbing 4 is not extended in a width direction (peripheral direction), i.e., non-expanding condition of the bag. FIG. 9(b) illustrates a condition in which the mesh webbing 4 is extended in the width direction, i.e., the expanding condition of the bag. In FIGS. 9(a) and 9(b), the reference indicator L denotes a longitudinal direction of the mesh webbing 4, and the reference indicator W denotes a width direction of the mesh webbing 4.

The mesh webbing 4 can be generally constructed with a knitted fabric having a knitting structure called a denbigh structure, as shown in FIG. 9. This knitted fabric is knitted such that a plurality of pieces of knitting yarn align in such a manner so as to be approximately in parallel with the longitudinal direction L of the mesh webbing 4, and that a distance between each of the pieces of the knitting yarn can easily be expanded, as shown in FIGS. 9(a) and 9(b). Accordingly, when a stitching work for the mesh webbing 4 and other material (for example, webbing 2 or the like) is performed such that the seam extends in a direction in parallel with the longitudinal direction of the mesh webbing 4, a stitching thread easily gets between each of the pieces of knitting yarn. When the stitching thread gets between each of the pieces of the knitting yarn, the width of the mesh webbing 4 is increased as a result, and a dimensional error occurs between a designed value and that of the real product.

Accordingly, the stitching work for the mesh webbing 4 and the other member is preferably performed such that the seam substantially extends in a direction across the longitudinal direction of the mesh webbing 4. By performing the stitching work for the mesh webbing 4 as described above, it becomes harder for the stitching thread to get between each of the pieces of knitting yarn of the mesh webbing 4. Thus, the width of the actually manufactured mesh webbing 4 is prevented from becoming larger or is suppressed from becoming larger than that of the designed value.

The words "a seam of the stitching work substantially extends in a direction across the longitudinal direction of the mesh webbing" can refer to seams that extend in a direction orthogonal to the longitudinal direction of the mesh webbing 4, or to seams that extend at an angle of inclination with respect to the direction orthogonal to the longitudinal direction of the mesh webbing 4. The angle of inclination can be 10° or less, specifically, 4° or less. However, when a part of the seam is 10% or less of an entire length of the seam, specifically, 4.7% or less, that part of the seam may be partially extended in the longitudinal direction of the mesh webbing 4.

Figure 10A:
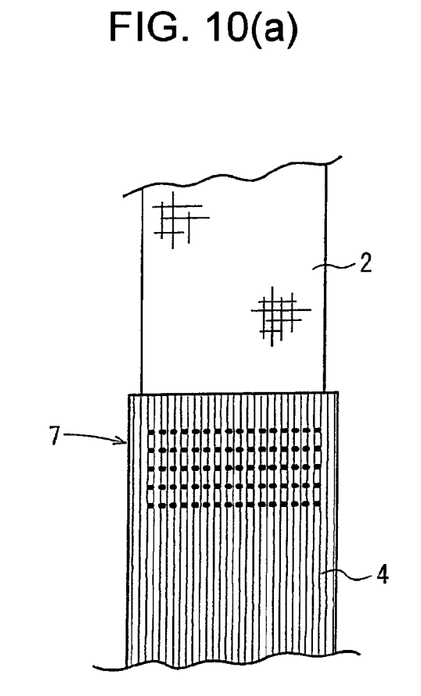
Figure 10B:
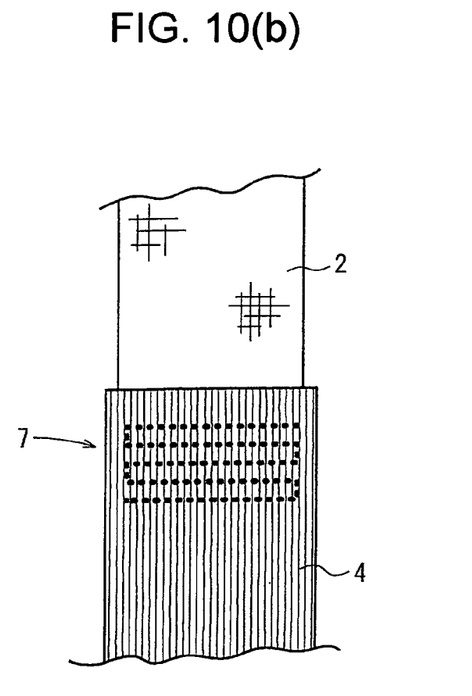
Figure 10C:
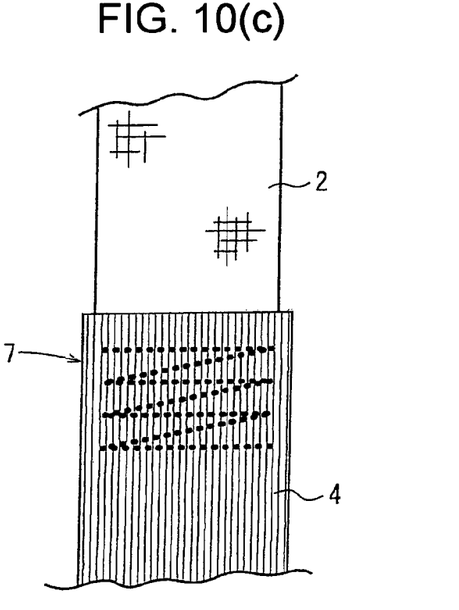

In FIGS. 10(a) through 10(c), embodiments of the stitching work are shown. Any of FIGS. 10(a) through 10(c) illustrates the seam 7 for stitching the rear end side of the mesh webbing 4 and the webbing 2 together.

In FIG. 10(a), the mesh webbing 4 is stitched on the webbing 2 by extending a plurality of ridges of the seam 7 in a direction substantially orthogonal to the longitudinal direction of the mesh webbing 4 and in parallel with each other.

In FIG. 10(b), the seam 7 can be formed to extend in such a manner so as to reciprocate for a plurality of times in the direction substantially orthogonal to the longitudinal direction of the mesh webbing 4. The seam 7 may be formed to be reciprocating in such a manner so as to be folded back in an approximately C-shaped manner at one end side in the direction substantially orthogonal to the longitudinal direction of the mesh webbing 4. However, a length of the seam 7 extending in the longitudinal direction of the mesh webbing 4 at this folding-back point is to a small degree, and the width of the mesh webbing 4 is not practically or substantially enlarged at all.

In FIG. 10(c), the seam 7 can extend in a zigzag manner (z-shape) in a direction substantially orthogonal to the longitudinal direction of the mesh webbing 4, and in an inclining direction relative to the longitudinal direction of the mesh webbing 4.

Any of the above-described stitching works of FIGS. 10(a) through 10(c) is an example, and the stitching work for the mesh webbing 4 is not limited thereto. Further, it is preferable though not required that the seams other than the seam 7 are also extending in a direction across the longitudinal direction of the mesh webbing 4 as described above.

The aforementioned embodiments are examples of the present invention, and the present invention is not limited thereto. For example, it is clear that the shape and the folding back configuration of the bag 3 may also be configurations other than those illustrated.

Although the lap airbelt is connected to the lap anchor in the aforementioned embodiments, the lap airbelt may be connected to the tongue that serves as an anchor in a similar manner as that of the aforementioned embodiments, and a gas-introducing inlet may be provided in a tongue as described in the Japanese Patent Application Publication No. 2001-260807.

Further, the airbelt is not limited to be the lap airbelt, but the airbelt may be a shoulder airbelt. In this case, the shoulder airbelt may also be connected to a tongue, as described in the Japanese Patent Application Publication No. 2001-260807.

The priority applications Japanese Patent Application No. 2006-212246, filed Aug. 3, 2006, and Japanese Patent Application No. 2005-295143, filed Oct. 7, 2005, are incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbelt apparatus comprising:
    an airbelt including a webbing, a bag connected to an end of the webbing, and a mesh webbing covering the webbing and the bag, wherein the airbelt is expandable by gas introduced into the bag;
    an anchor including an opening, wherein only a tip end side of a portion of the airbelt is inserted into the opening; and
    a protecting cover,
    wherein the portion of the airbelt inserted into the opening is an extended portion of the mesh webbing that extends past the bag and the protecting cover, wherein the extended portion of the mesh webbing is folded back and overlaps onto a base end side of the airbelt,
    wherein the tip end side of the portion of the airbelt and the base end side of the airbelt are stitched together, and
    wherein the protecting cover covers the tip end side of the portion of the airbelt and the base end side of the airbelt that are stitched together and a tip end side of the webbing.

2. The airbelt apparatus according to claim 1, wherein the extended portion of the mesh webbing overlapping the base end side of the airbelt is stitched on the mesh webbing and the bag at the base end side of the airbelt.

3. The airbelt apparatus according to claim 2, wherein the extended portion of the mesh webbing overlapping the base end side of the airbelt is stitched on the webbing, the bag and the mesh webbing at the base end side of the airbelt.

4. The airbelt apparatus according to claim 1, wherein the webbing is connected to rear end sides of the mesh webbing and the bag.

5. The airbelt apparatus according to claim 4, wherein the rear end side of the mesh webbing extends out relatively longer toward the webbing in relation to the rear end side of the bag, and wherein the mesh webbing is stitched on the webbing at a portion in the mesh webbing, which is spaced apart from the rear end side of the bag at a predetermined distance.

6. The airbelt apparatus according to claim 5, wherein a stitching work for the mesh webbing and the webbing is performed such that a seam of the stitching work substantially extends in a direction across a longitudinal direction of the mesh webbing.

7. The airbelt apparatus according to claim 1, wherein a stitching work for the tip end side of the portion of the airbelt overlapping the base end side of the airbelt is performed such that a seam of the stitching work substantially extends in a direction across the longitudinal direction of the airbelt.

8. The airbelt apparatus according to claim 1, further comprising a gas generator.

9. An airbelt apparatus comprising:
    an airbelt comprising a bag and a mesh webbing covering the bag, wherein the airbelt is expandable by gas introduced into the bag;
    an anchor with an opening; and
    a protecting cover,
    wherein a tip end side of the mesh webbing extends out more than a tip end of the bag and a tip end of the protecting cover,
    wherein only the tip end side of the mesh webbing is inserted into the opening,
    wherein the mesh webbing is folded back so as to overlap onto a base end side of the airbelt,
    wherein the tip end side of the mesh webbing and the base end side of the airbelt are stitched together, and
    wherein the protecting cover covers the tip end side of the mesh webbing and the base end side of the airbelt that are stitched together.

10. The airbelt apparatus according to claim 9, wherein a tip end portion of the mesh webbing overlapping the base end side of the airbelt is stitched on the bag and the mesh webbing at the base end side of the airbelt.

11. The airbelt apparatus according to claim 9, wherein the airbelt further includes a webbing connected to rear end sides of the mesh webbing and the bag.

12. The airbelt apparatus according to claim 11, wherein the rear end side of the mesh webbing extends out relatively longer toward the webbing in relation to the rear end side of the bag, and wherein the mesh webbing is stitched on the webbing at a portion in the mesh webbing, which is spaced apart from the rear end side of the bag at a predetermined distance.

13. The airbelt apparatus according to claim 9, wherein a stitching work for the tip end side of the mesh webbing and the base end side of the airbelt is performed such that a seam of the stitching work substantially extends in a direction across the longitudinal direction of the mesh webbing.

* * * * *